United States Patent
Wu

(10) Patent No.: US 9,739,990 B2
(45) Date of Patent: Aug. 22, 2017

(54) BLIND REGION MIRROR STRUCTURE AND VEHICLE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wei-Feng Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 235 days.

(21) Appl. No.: 14/583,936

(22) Filed: Dec. 29, 2014

(65) Prior Publication Data

US 2015/0183375 A1  Jul. 2, 2015

(30) Foreign Application Priority Data

Dec. 30, 2013  (CN) .......................... 2013 1 0741327

(51) Int. Cl.
| | |
|---|---|
| *G02B 17/00* | (2006.01) |
| *B60R 1/08* | (2006.01) |
| *B60R 1/10* | (2006.01) |
| *G02B 17/02* | (2006.01) |
| *G02B 23/08* | (2006.01) |

(52) U.S. Cl.
CPC .............. *G02B 17/008* (2013.01); *B60R 1/10* (2013.01); *G02B 17/023* (2013.01); *G02B 23/08* (2013.01)

(58) Field of Classification Search
CPC .......... B60R 1/10; B60R 1/081; G02B 17/008; G02B 23/08; G02B 17/023
See application file for complete search history.

(56) References Cited

U.S. PATENT DOCUMENTS

| | | | | |
|---|---|---|---|---|
| 3,482,897 | A | * 12/1969 | Hopp | ................... G02B 7/1805 |
| | | | | 359/402 |
| 6,590,725 | B2 | * 7/2003 | Kho | ......................... B60R 1/10 |
| | | | | 359/834 |

* cited by examiner

*Primary Examiner* — Glenn Dayoan
*Assistant Examiner* — Melissa A Black
(74) *Attorney, Agent, or Firm* — Steven Reiss

(57) ABSTRACT

A mirror structure permitting an undistorted view of the blind spots of a vehicle include a first lens module and a second lens module. The first lens module is mounted on an A-pillar of a vehicle and located outside of the vehicle; the second lens module is opposite the first lens module and mounted inside of the vehicle on the A-pillar. The first lens module focuses light beams which would otherwise be blocked by the A-pillar of the vehicle and transmits the light beams to a front windshield of the vehicle, the light beam passing through the front windshield to reach the second lens module, the second lens module diffusing the light beams into the vision of a driver.

15 Claims, 2 Drawing Sheets

BLIND REGION MIRROR STRUCTURE AND VEHICLE USING THE SAME

FIELD

The subject matter herein generally relates to driving safety.

BACKGROUND

Vehicle bodies generally have an A-shaped pillar between each of the front doors and front windshield, used to protect the driver. In order to strengthen the A-pillar, the width of the A-pillar is wide. Therefore, car driving especially during turning is dangerous; the A-pillar can block the driver's sight and form a blind region. Generally to reduce the blind region concave or convex mirrors can be fitted to the front windshield. However, concave and convex mirrors give a distorted image to the driver.

BRIEF DESCRIPTION OF THE DRAWINGS

Implementations of the present technology will now be described, by way of example only, with reference to the attached figures.

DETAILED DESCRIPTION

This disclosure provides a blind region mirror structure for a vehicle in which the driver can see the surrounding scene without distortion.

A vehicle comprises a vehicle body, a front windshield, a left front door, a right front door and at least one blind region mirror structure. The vehicle body includes at least one A-pillar, the blind region mirror structure being set on the A-pillar.

The blind region mirror structure comprises a first lens module and a second lens module, the first lens module is located outside of the vehicle and the second lens module is located inside of the vehicle. The first lens module includes a first convex lens, a first concave lens, a first reflection mirror, and a second reflection mirror. The first convex lens is mounted away from the A-pillar; the first reflection mirror is opposite to the first convex lens and mounted on the A-pillar. The first concave lens is set between the first convex lens and the first reflection mirror, the second reflection mirror aligns with the first reflection mirror and is mounted on the front windshield. The second lens module includes a third reflection mirror, a fourth reflection mirror, a second concave lens, and a second convex lens. The third reflection mirror is aligned with the second reflection mirror and is mounted on the front windshield; the fourth reflection mirror is aligned with the third reflection mirror and is mounted on the A-pillar. The second convex lens is mounted away from the A-pillar and is opposite to the fourth reflection mirror, the second concave lens is set between the fourth reflection mirror and the second convex lens and is aligned with the fourth reflection mirror and the second convex lens. A light beam which would be blocked by the A-pillar of the vehicle is focused by the first convex lens and transmitted to the first concave lens, then transmitted by the first concave to the first reflection mirror, and reflected to the second reflection mirror. The light beam passes through the front windshield of the vehicle to reach the third reflection mirror. The light beam is transmitted to the second convex lens by the second concave lens after being reflected by the third and fourth reflection mirrors. The second convex lens is capable of diffusing the light beam.

Since the external light beam does not change direction in passing through the blind region mirror structure, the driver can see all surrounding scene without distortion, thus promoting safer driving.

Figure 1:
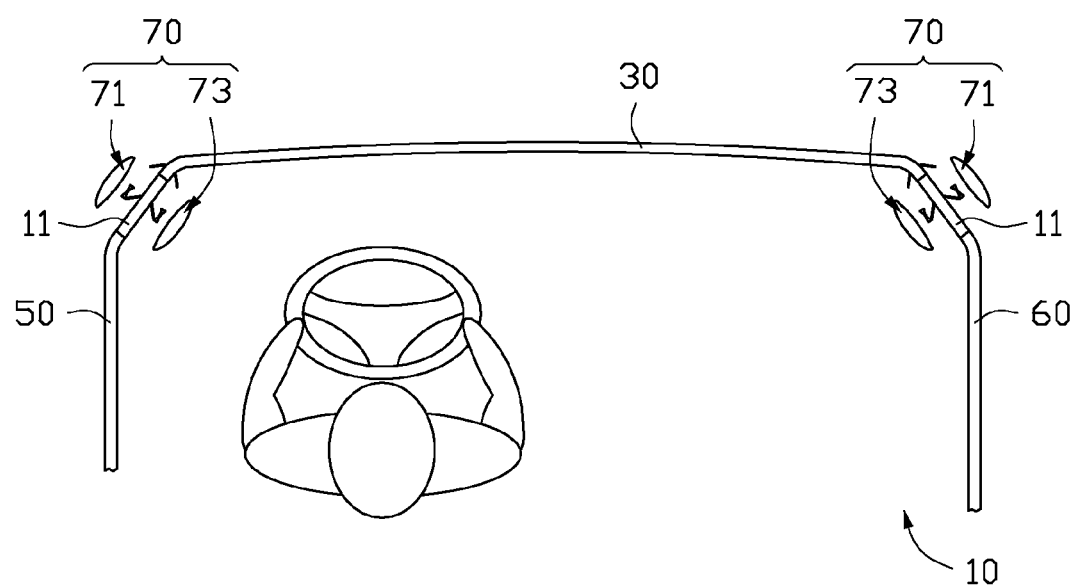
FIG. 1 is a diagrammatic view of a part of vehicle including a blind region mirror structure, according to an embodiment of the present disclosure.

FIG. 1 illustrates an embodiment of a part of a vehicle 100, the vehicle 100 comprising a vehicle body 10, a front windshield 30, a left front door 50, a right front door 60 and two blind region mirror structures 70. The front windshield 30, the left front door 50, and the right front door 60 are installed on the vehicle body 10. One of the two blind region mirror structures 70 is installed between the front windshield 30 and the left front door 50. The other blind region mirror structure 70 is installed between the front windshield 30 and the right front door 60.

The vehicle body 10 includes two A-pillars 11, one of the A-pillars 11 is located between the front windshield 30 and the left front door 50 and supports one of the blind region mirror structures 70. Another A-pillar 11 is located between the front windshield 30 and the right front door 60 and supports the other blind region mirror structure 70.

Each blind region mirror structure 70 comprises a first lens module 71 and a parallel second lens module 73. The first lens module 71 is mounted on the A-pillar 11 and located outside of the vehicle body 10, the second lens module 73 is opposite the first lens module 71 and mounted on the A-pillar 11 and located inside of the vehicle body 10. The first lens module 71 focuses any light beam (not shown) that would otherwise be blocked by the A-pillar 11 of the vehicle body 10, such light beams pass through the front windshield 30 of the vehicle body 10 to reach the second lens module 73. The second lens module 73 diffuses the light beams to eliminate the blind region that is covered by the A-pillar 11.

Figure 2:
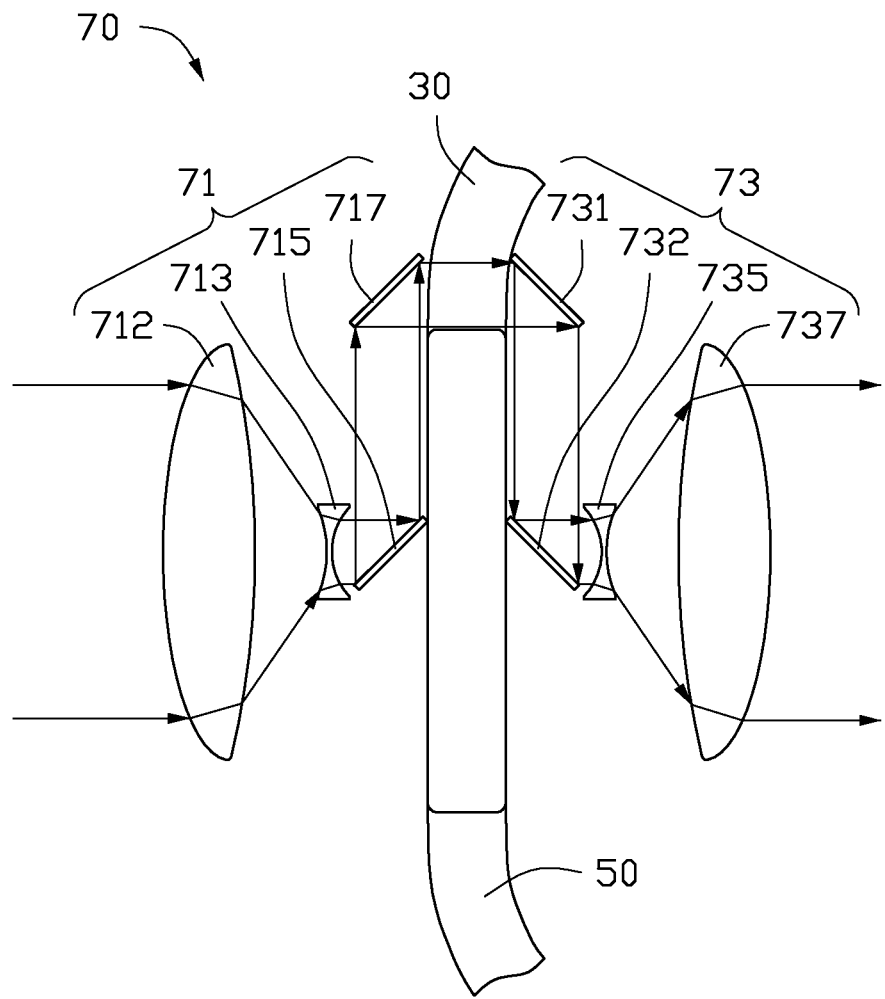
FIG. 2 is a diagrammatic view of a blind region mirror structure shown in FIG. 1.

FIG. 2 also illustrates the blind region mirror structure 70 shown in FIG. 1. The first lens module 71 includes a first convex lens 712, a first concave lens 713, a first reflection mirror 715, and a second reflection mirror 717. The first convex lens 712 is mounted away from the A-pillar 11 and is roughly parallel with the A-pillar 11. The first reflection mirror 715 is opposite the first convex lens 712 and near the A-pillar 11. The first concave lens 713 is located between the first convex lens 712 and the first reflection mirror 715 and is parallel to and coaxial with the first convex lens 712. The second reflection mirror 717 is close to the A-pillar 11, is mounted on the front windshield 30 and is in parallel alignment with the first reflection mirror 715. The first convex lens 712 focuses light beams and transmits them to the first concave lens 713, then the first concave lens 713 transmits the light beams to the first reflection mirror 715 and the first reflection mirror 715 reflects the light beams to the second reflection mirror 717. Finally, the second reflection mirror 717 transmits the light beams to the front windshield 30.

The second lens module 73 includes a third reflection mirror 731, a fourth reflection mirror 732, a second concave lens 735, and a second convex lens 737. The third reflection mirror 731 close to the A-pillar 11 is mounted on the front windshield 30 and is aligned with the second reflection mirror 717. The fourth reflection mirror 732 close to the A-pillar 11 is parallel to the third reflection mirror 731 and symmetrically set with the first reflection mirror 715. The second convex lens 737 is mounted away from the A-pillar 11 and is roughly parallel with the set of the A-pillar 11 and opposite to the fourth reflection mirror 732, convenient for the vision of a driver of the vehicle 100. The second concave lens 735 is located between and aligned with the fourth reflection mirror 732 and the second convex lens 737, the second concave lens 735 is parallel to and coaxial with the second convex lens 737.

The second convex lens 737, the second concave lens 735, the first concave lens 713, and the first convex lens 712 is coaxial parallel interval set, wherein the second convex lens 737 with the second concave lens 735 of the second lens module 73 and the first concave lens 713 with the first convex lens 712 of the first lens module 71 is opposite to the A-pillar 11 symmetry set. The light beams reflected by the second reflection mirror 717 pass through the front windshield 30 of the vehicle body 10 to reach the third reflection mirror 731. The third reflection mirror 731 reflects the light beams to the fourth reflection mirror 732, then the fourth reflection mirror 732 reflects the light beams to the second concave lens 735. The second concave lens 735 transmits the light beams to the second convex lens 737 and the second convex lens 737 finally diffuses the light beams. Thereby, the driver of the vehicle 100 can watch that part of the surrounding scene which is shielded by the A-pillar 11 of the vehicle body 10.

The quantity of blind region mirror structures 70 is not limited to two as in the present embodiment; it may also be one or more than two. The first reflection mirror 715 and the second reflection mirror 717, the third reflection mirror 731, and the fourth reflection mirror 732 are not parallel or set symmetrically, if only the first reflection mirror 715 alignment the second reflection mirror 717, and the third reflection mirror 731 alignment the fourth reflection mirror 732. The second reflection mirror 717 and the third reflection mirror 731 cannot mounted directly on the front windshield 30, if only through a bracket makes the second reflection mirror 717 and the third reflection mirror 731 interval setting with the front windshield 30 separately.

The embodiments shown and described above are only examples. Many details are often found in the art such as the other features of a blind region mirror structure of the vehicle. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle comprising:
a vehicle body comprising at least one A-pillar;
a front windshield;
a left front door;
a right front door; and
at least one blind region mirror structure mounted on the A-pillar;
wherein, the at least one blind region mirror structure comprises a first lens module and a second lens module, the first lens module is located outside of the vehicle and the second lens module is located inside of the vehicle;
wherein, the first lens module comprises a first convex lens, a first concave lens, a first reflection mirror and a second reflection mirror; the first convex lens is mounted away from the A-pillar, and first convex lens is parallel with the A-pillar; the first reflection mirror faces towards the first convex lens, and the first reflection mirror is mounted on the A-pillar, the first concave lens is set between the first convex lens and the first reflection mirror, the second reflection mirror aligns with the first reflection mirror, and the second reflection mirror is mounted on the front windshield; and
wherein, the second lens module comprises a third reflection mirror, a fourth reflection mirror, a second concave lens and a second convex lens; the third reflection mirror is aligned with the second reflection mirror, and the third reflection mirror is mounted on the front windshield; the fourth reflection mirror is aligned with the third reflection mirror, and the fourth reflection mirror is mounted on the A-pillar, the second convex lens is mounted away from the A-pillar, the second convex lens is parallel with the A-pillar, and the second convex lens faces towards the fourth reflection mirror, the second concave lens is set between the fourth reflection mirror and the second convex lens, and the second concave lens is aligned with the fourth reflection mirror and the second convex lens.

2. The vehicle of claim 1, wherein the vehicle further comprises two blind region mirror structures, one of the blind region mirror structures is installed between the front windshield and the left front door, another one is installed between the front windshield and the right front door.

3. The vehicle of claim 1, wherein the vehicle body comprises two A-pillars, one of the A-pillars located between the front windshield and the left front door, another one A-pillar located between the front windshield and the right front door.

4. The vehicle of claim 1, wherein the first convex lens focuses a light beam shielded by the A-pillar, and the light beam is transmitted to the first concave lens, the first concave lens transmits the light beam to the first reflection mirror, the first reflection mirror reflects the light beam to the second reflection mirror, the second reflection mirror reflects the light beam to pass through the front windshield to reach the third reflection mirror, the third reflection mirror reflects the light beam to the fourth reflection mirror, the fourth reflection mirror reflects the light beam to the second concave lens, the second concave lens transmits the light beam to the second convex lens, and the second convex lens diffuses the light beam.

5. The vehicle of claim 1, wherein the second convex lens and the second concave lens of the second lens module face away from the A-pillar symmetry set with the first concave lens and the first convex lens of the first lens module.

6. The vehicle of claim 5, wherein the second convex lens, the second concave lens, the first concave lens and the first convex lens is a coaxial parallel interval set.

7. The vehicle of claim 1, wherein the first reflection mirror and the fourth reflection mirror are nearby the A-pillars, the first reflection mirror parallel to the second reflection mirror, the fourth reflection mirror parallel to the third reflection mirror.

8. The vehicle of claim 1, wherein the second reflection mirror is nearby the A-pillar mounted on the front windshield and the third reflection mirror symmetric set.

9. A blind region mirror structures mounted on an A-pill- and near a front windshield of a vehicle comprising:
a first lens module located outside of the vehicle; and a second lens module facing away the first lens module, and the second lens module is located inside of the vehicle;

wherein the first lens module comprises a first convex lens, a first concave lens, a first reflection mirror and a second reflection mirror; the first convex lens is mounted away from the A-pillar, and first convex lens is parallel with the A-pillar; the first reflection mirror faces towards the first convex lens, and the first reflection mirror is mounted on the A-pillar, the first concave lens is set between the first convex lens and the first reflection mirror, the second reflection mirror aligns with the first reflection mirror, and the second reflection mirror is mounted on the front windshield; and wherein, the second lens module comprises a third reflection mirror, a fourth reflection mirror, a second concave lens and a second convex lens; the third reflection mirror is aligned with the second reflection mirror, and the third reflection mirror is mounted on the front windshield; the fourth reflection mirror is aligned with the third reflection mirror, and the fourth reflection mirror is mounted on the A-pillar, the second convex lens is mounted away from the A-pillar, the second convex lens is parallel with the A-pillar, and the second convex lens faces towards the fourth reflection mirror, the second concave lens is set between the fourth reflection mirror and the second convex lens, and the second concave lens is aligned with the fourth reflection mirror and the second convex lens.

10. The blind region mirror structures of claim 9, wherein the first convex lens focuses a light beam shielded by the A-pillar, and the light beam is transmitted to the first concave lens, the first concave lens transmits the light beam to the first reflection mirror, the first reflection mirror reflects the light beam to the second reflection mirror, the second reflection mirror reflects the light beam to pass through the front windshield to reach the third reflection mirror, the third reflection mirror reflects the light beam to the fourth reflection mirror, the fourth reflection mirror reflects the light beam to the second concave lens, the second concave lens transmits the light beam to the second convex lens, and the second convex lens diffuses the light beam.

11. The blind region mirror structures of claim 9, wherein the second convex lens and the second concave lens of the second lens module face away from the A-pillar symmetry set with the first concave lens and the first convex lens of the first lens module.

12. The blind region mirror structures of claim 11, wherein the second convex lens, the second concave lens, the first concave lens and the first convex lens is a coaxial parallel interval set.

13. The blind region mirror structures of claim 9, wherein the first reflection mirror and the fourth reflection mirror nearby the A-pillars, the first reflection mirror parallel to the second reflection mirror, the fourth reflection mirror parallel to the third reflection mirror.

14. The blind region mirror structures of claim 9, wherein the second reflection mirror is nearby the A-pillar mounted on the front windshield and the third reflection mirror symmetric set.

15. The blind region mirror structures of claim 9, wherein the second reflection mirror and the third reflection mirror by a bracket to interval setting with the front windshield separately.

* * * * *